United States Patent
Yamada

(10) Patent No.: US 8,034,477 B2
(45) Date of Patent: Oct. 11, 2011

(54) CHIP BATTERY

(75) Inventor: Kazuhiro Yamada, Yasu (JP)

(73) Assignee: Murata Manufacuting Co., Ltd., Kyoto (JP)

( * ) Notice: Subject to any disclaimer, the term of this patent is extended or adjusted under 35 U.S.C. 154(b) by 82 days.

(21) Appl. No.: 12/177,971

(22) Filed: Jul. 23, 2008

(65) Prior Publication Data

US 2008/0274412 A1    Nov. 6, 2008

Related U.S. Application Data

(63) Continuation of application No. PCT/JP2006/325603, filed on Dec. 22, 2006.

(30) Foreign Application Priority Data

Jan. 24, 2006   (JP) .................. 2006-014830

(51) Int. Cl.
*H01M 6/46*   (2006.01)
*H01M 2/02*   (2006.01)
*H01M 4/525*  (2010.01)
*H01M 4/66*   (2006.01)
*H01M 6/18*   (2006.01)
*H01M 2/30*   (2006.01)

(52) U.S. Cl. ........ 429/162; 429/178; 429/304; 429/322; 429/231.95; 429/231.5; 429/234; 429/245

(58) Field of Classification Search .......... 429/211, 429/24, 245, 178, 162, 322, 233, 179, 304, 429/231.95, 231.7, 234
See application file for complete search history.

(56) References Cited

U.S. PATENT DOCUMENTS

| | | | |
|---|---|---|---|
| 6,106,973 A * | 8/2000 | Sonozaki et al. | 429/162 |
| 2002/0142211 A1 | 10/2002 | Nakanishi et al. | |
| 2003/0232248 A1 * | 12/2003 | Iwamoto et al. | 429/233 |
| 2005/0141170 A1 * | 6/2005 | Honda et al. | 361/311 |
| 2005/0196668 A1 | 9/2005 | Nanno et al. | |

FOREIGN PATENT DOCUMENTS

| | | |
|---|---|---|
| EP | 1049183 A1 * | 11/2000 |
| JP | 2000-243372 A | 9/2000 |
| JP | 2002-352850 A | 12/2002 |
| JP | 2003-168416 A | 6/2003 |
| JP | 2004-95200 A | 3/2004 |

OTHER PUBLICATIONS

Official Communication issued in International Patent Application No. PCT/JP2006/325603, mailed on Mar. 27, 2007.

* cited by examiner

*Primary Examiner* — Jonathan Crepeau
*Assistant Examiner* — Kenneth Douyette
(74) *Attorney, Agent, or Firm* — Keating & Bennett, LLP

(57) ABSTRACT

A chip battery includes an element body including a solid electrolyte layer, a positive electrode layer, and a negative electrode layer. Current collectors are provided on the positive electrode layer and the negative electrode layer, respectively, of the element body using a conductive material, such as Pt. In addition, protective films are provided on both end surfaces of the element body and on the current collectors so that the current collectors are exposed near the respective ends in the longitudinal direction of the element body. Further, protective films are provided on the side surfaces of the element body to define a base body. Further, terminal electrodes are provided on the base body so as to be brought into surface contact with the exposed surfaces of the current collectors on both end sides in a direction substantially perpendicular to the lamination direction of the element body.

22 Claims, 5 Drawing Sheets

CHIP BATTERY

BACKGROUND OF THE INVENTION

1. Field of the Invention

The present invention relates to a chip battery including a solid electrolyte.

2. Description of the Related Art

A chip battery includes an element body including, for example, a solid electrolyte layer and positive and negative electrode layers provided on both surfaces of the solid electrolyte layer. In addition, terminal electrodes are provided on the positive and negative electrode layers of the element body. In order to increase the battery capacity of such a chip battery, it is necessary to increase the amount of the electrode active material included in each of the positive and negative electrode layers. Also, in order to increase the output current, it is necessary to increase the opposing area between the terminal electrode and the positive electrode layer and the opposing area between the terminal electrode and the negative electrode layer. On the other hand, chip batteries are often mounted on substrates, and chip batteries are required to have a lower profile as other devices have lower profiles.

In order to satisfy these conditions, a solid electrolyte layer, a positive electrode layer, a negative electrode layer, and terminal electrodes are preferably laminated in a direction substantially perpendicular to a mounting surface of a chip battery. However, when terminal electrodes are provided on both sides in the direction substantially perpendicular to a mounting surface of a chip battery, it is necessary to perform wire bonding between the terminal electrode on the upper surface and a substrate and to accommodate the chip battery in a package which can be surface-mounted, thereby preventing surface-mounting of the chip battery as a single unit. In order to surface-mount a chip battery, terminal electrodes are preferably provided on both ends in a direction substantially perpendicular to the lamination direction of an element body as in a chip capacitor.

Therefore, a configuration of a chip battery is shown in FIGS. 8A and 8B. A chip battery 1 includes a solid electrolyte layer 2. In addition, a positive electrode layer 3 is provided on one of the surfaces of the solid electrolyte layer 2, and a negative electrode layer 4 is provided on the other surface of the solid electrolyte layer 2. Further, current collectors 5a and 5b are provided on the positive electrode layer 3 and the negative electrode layer 4, respectively. The positive electrode layer 3 and the current collector 5a are arranged so as to extend from one of the ends to the other end in a direction substantially perpendicular to the lamination direction of the solid electrolyte layer 2 and the positive and negative electrode layers 3 and 4 and so as not to be exposed at the other end. The negative electrode layer 4 and the current collector 5b are arranged so as to extend from the other end to the one end in a direction substantially perpendicular to the lamination direction of the solid electrolyte layer 2 and the positive and negative electrode layers 3 and 4 and so as not to be exposed at the one end.

Furthermore, an insulator layer 6 is provided on each of the current collectors 5a and 5b. In addition, terminal electrodes 7 and 8 are provided on both end surfaces of the laminate in a direction substantially perpendicular to the lamination direction thereof. The ends of the positive electrode layer 3 and the current collector 5a are electrically connected to one 7 of the terminal electrodes. The ends of the negative electrode layer 4 and the current collector 5b are electrically connected to the other terminal electrode 8. Further, a resin layer 9 is provided on each of the lamination surfaces of the laminate between the terminal electrodes 7 and 8.

In such a chip battery 1, good charge-discharge properties can be achieved by optimizing the thickness of each of the solid electrolyte layer 2 and the positive and negative electrode layers 3 and 4. Also, the current collectors 5a and 5b are brought into line contact with the terminal electrodes 7 and 8, respectively, thereby decreasing the area of the contact portions between the current collectors 5a and 5b and the terminal electrodes 7 and 8. Therefore, even when unit cells are laminated to define a chip battery having a multi-cell structure, a small chip battery without increasing the mounting area can be achieved (refer to Japanese Unexamined Patent Application Publication No. 2002-352850).

The chip battery shown in FIG. 8 includes the element body including layers laminated in a direction substantially perpendicular to a mounting surface, and the terminal electrodes provided on both end surfaces of the element body in a direction substantially perpendicular to the lamination direction thereof, thereby permitting surface mounting. However, since a current collector is brought into line contact with each terminal electrode, the contact area therebetween and the reliability of connection between the current collector and the terminal electrode are decreased and the internal resistance of the chip battery is increased.

SUMMARY OF THE INVENTION

To overcome the problems described above, preferred embodiments of the present invention provide a chip battery which permits surface mounting and a lower profile and which has improved connection reliability between a current collector and a terminal electrode and a low internal resistance.

According to a preferred embodiment of the present invention, a chip battery includes an element body including a solid electrolyte layer, a positive electrode layer provided on one of the surfaces of the solid electrolyte layer, and a negative electrode layer provided on the other surface of the solid electrolyte layer, current collectors respectively provided on the positive electrode layer and the negative electrode layer of the element body, and terminal electrodes provided on both end surfaces of the element body in a direction substantially perpendicular to the lamination direction thereof, the current collectors being in surface contact with the respective terminal electrodes.

The surface contact between the current collector and each of the terminal electrodes increases the contact area therebetween, thereby increasing the contact reliability of the chip battery. Further, the contact area between the current collector and each of the terminal electrodes is increased, thereby achieving a reduced internal resistance of the chip battery.

Further, the terminal electrodes are provided on both end surfaces in a direction substantially perpendicular to the lamination direction of the element body which includes the solid electrolyte layer, the positive electrode layer, and the negative electrode layer, thereby enabling surface mounting in a state in which a mounting surface of the chip battery is substantially perpendicular to the lamination direction of the element body.

In such a chip battery, protective films may be provided on the surfaces of the element body and the current collectors between the two terminal electrodes, and the current collectors may be exposed on the respective terminal electrode sides so that the exposed current collectors are brought into surface contact with the respective terminal electrodes.

In the chip battery having the terminal electrodes provided on both ends of the element body in the direction substantially perpendicular to the lamination direction thereof, when the protective films are arranged so that the current collectors are exposed on the respective terminal electrode sides, the exposed portions of the current collectors can be brought into surface contact with the respective terminal electrodes.

The terminal electrodes are arranged to cover both of the exposed portions of the current collectors and the protective films with the wrapping portions of the terminal electrodes. Therefore, it is possible to improve the overall adhesion including the protective film while securing the sealing property with the protective films.

According to preferred embodiments of the present invention, a chip battery having high connection reliability between a current collector provided on an element body and a terminal electrode and a low internal resistance is achieved by surface contact between the current collector and the terminal electrode. Therefore, the chip battery has outstanding battery characteristics. Furthermore, the terminal electrode is provided on either end of the element body in a direction substantially perpendicular to the lamination direction thereof, thereby enabling surface mounting in a state in which a mounting surface of the chip battery is substantially perpendicular to the lamination direction of the element body. Therefore, the chip battery has a lower profile and can be surface-mounted even when the capacity and current of the chip battery are increased.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
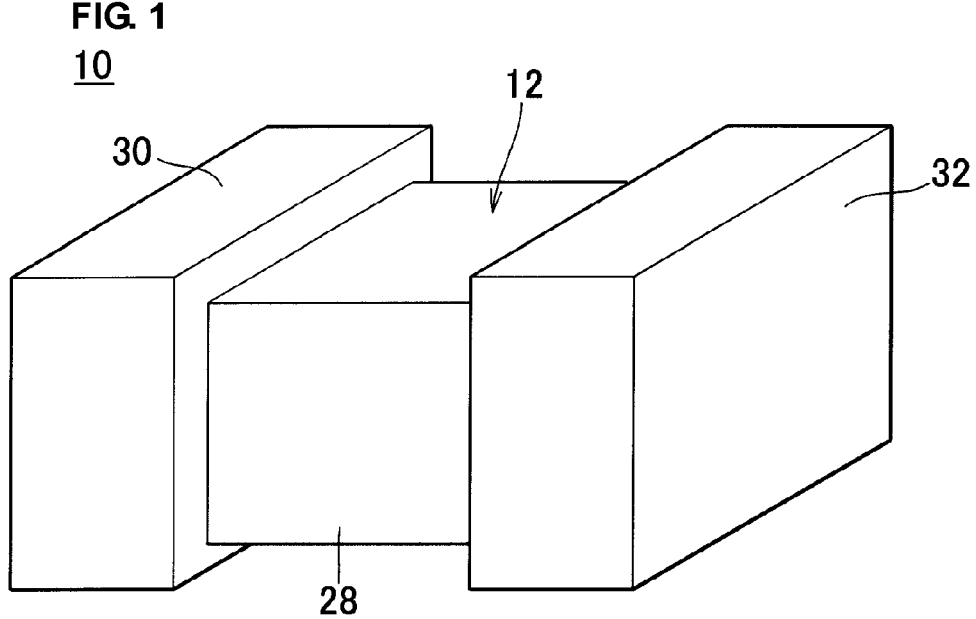
FIG. 1 is a perspective view showing a preferred embodiment of a chip battery according to the present invention.
Figure 2:
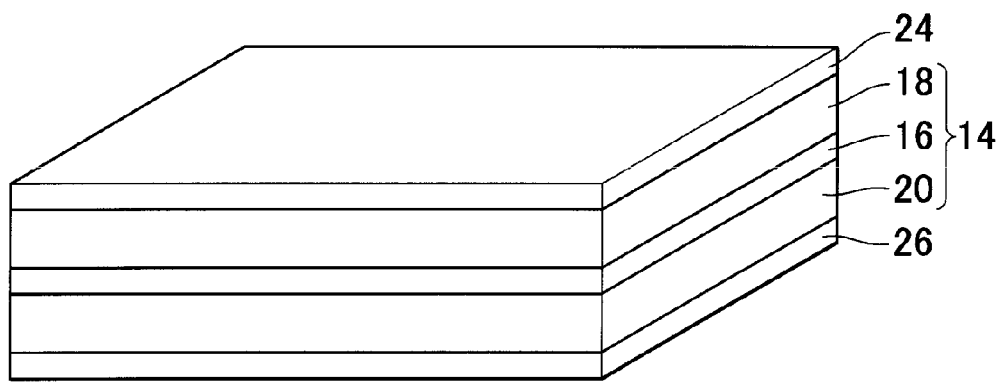
FIG. 2 is a perspective view showing an element body and current collectors provided on the element body used for the chip battery shown in FIG. 1.

FIG. 1 is a perspective view showing a preferred embodiment of a chip battery according to the present invention. A chip battery 10 includes a base body 12. As shown in FIG. 2, the base body 12 includes an element body 14 having a laminated structure. The element body 14 includes, for example, a substantially rectangular plate-shaped solid electrolyte layer 16. The shape of the solid electrolyte layer 16 may be a substantially square plate shape. As the solid electrolyte layer 16, for example, a sulfide-type solid electrolyte such as a Li—P—S solid electrolyte is used. A positive electrode layer 18 is provided on one of the surfaces of the solid electrolyte layer 16. In order to form the positive electrode layer 18, for example, a positive electrode active material, such as $LiCoO_2$, may be used. A negative electrode layer 20 is provided on the other surface of the solid electrolyte layer 16. In order to form the negative electrode layer 20, for example, a negative electrode active material, such as graphite, may be used. In addition to the positive electrode active material and the negative electrode active material, the positive electrode layer 18 and the negative electrode layer 20 may further include the solid electrolyte which defines the solid electrolyte layer 16. The purpose of mixing the solid electrolyte in each of the positive electrode layer 18 and the negative electrode layer 20 is to facilitate exchange of Li ions between each of the positive electrode layer 18 and the negative electrode layer 20 and the solid electrolyte layer 16.

Figure 3:
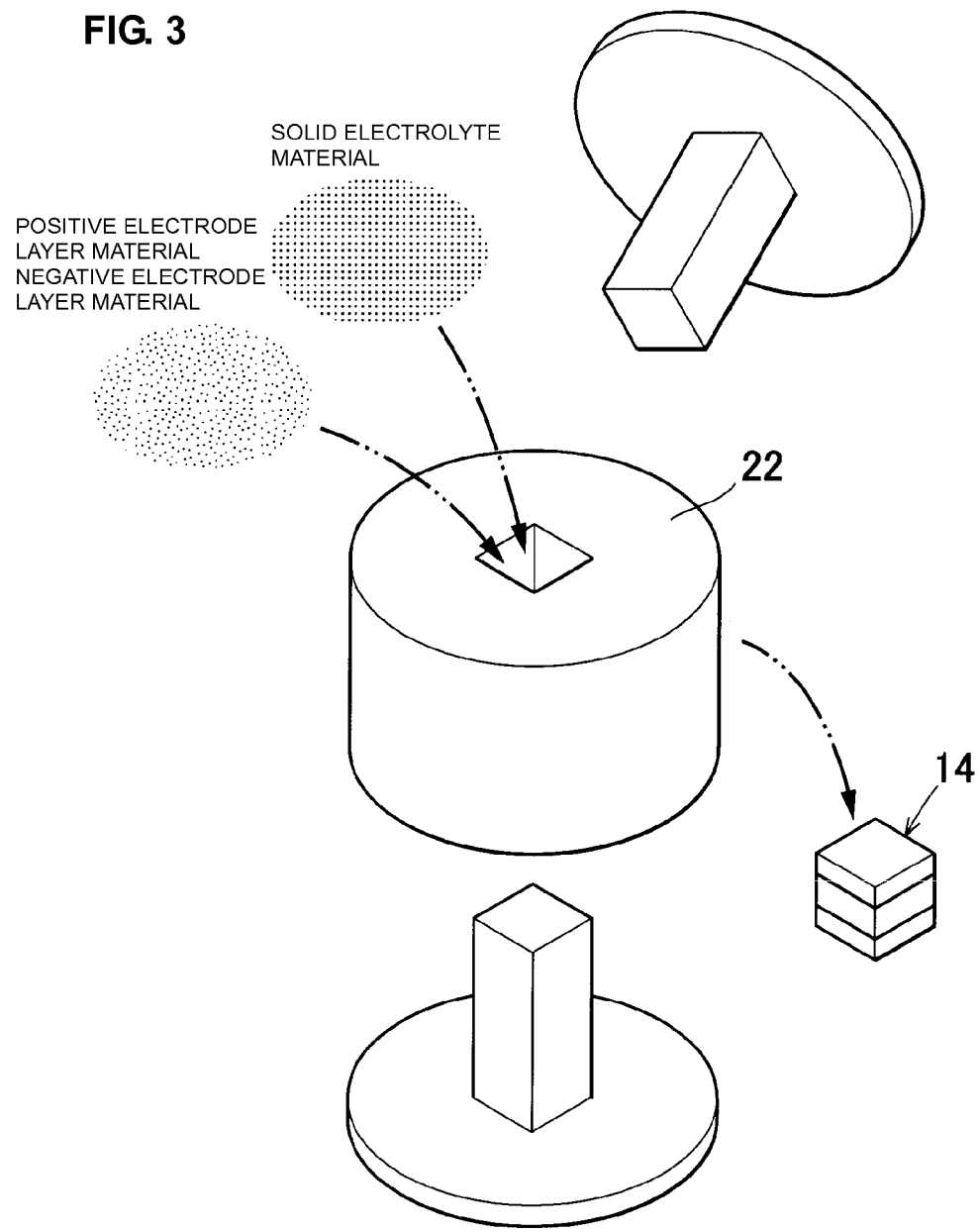
FIG. 3 is an explanatory view showing the production of the element body used for the chip battery shown in FIG. 1.

As shown in FIG. 3, the element body 14 is formed by placing powdery positive electrode layer material, solid electrolyte layer material, and negative electrode layer material in a mold 22 and then pressure-forming the materials. The element body 14 may be formed by pressure-forming positive electrode layer material, solid electrolyte layer material, and negative electrode layer material into a large plate and then cutting the plate.

In addition, current collectors 24 and 26 are provided on the positive electrode layer 18 and the negative electrode layer 20, respectively, of the resultant element body 14. The current collectors 24 and 26 are formed using, for example, a metal material such as Pt. In this case, the current collectors 24 and 26 are formed in a thin film by a vapor phase method, such as sputtering, vacuum vapor deposition, or other suitable method. Although the current collectors 24 and 26 are provided over substantially the entire surfaces of the positive electrode layer 18 and the negative electrode layer 20, respectively, the current collectors 24 and 26 may be configured to be smaller than the positive electrode layer 18 and the negative electrode layer 20, respectively, leaving the peripheral portions thereof exposed.

Figure 4:
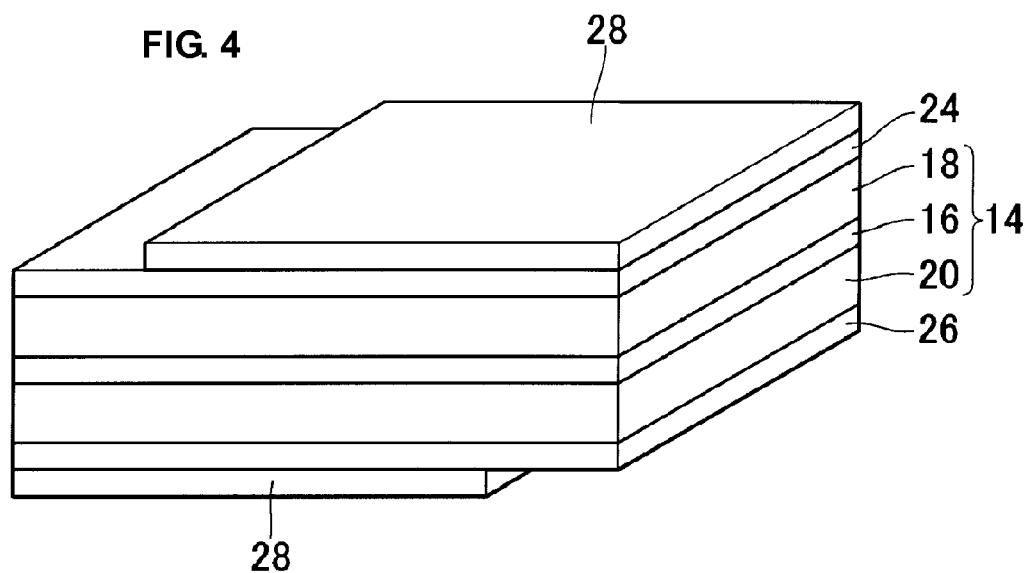
FIG. 4 is a perspective view showing a state in which protective films are provided on the surfaces of the current collectors formed on the element body shown in FIG. 2.

Furthermore, as shown in FIG. 4, a protective film 28 is provided on each of the current collectors 24 and 26 so as to partially expose each of the current collectors 24 and 26 provided on both surfaces of the substantially rectangular plate-shaped element body 14. The protective films 28 are formed using, for example, an insulating material, such as an epoxy resin. The protective films 28 are formed so that the current collectors 24 and 26 are exposed on the respective end surface sides in the longitudinal direction substantially perpendicular to the lamination direction of the element body 14 and the current collectors 24 and 26.

Figure 5:
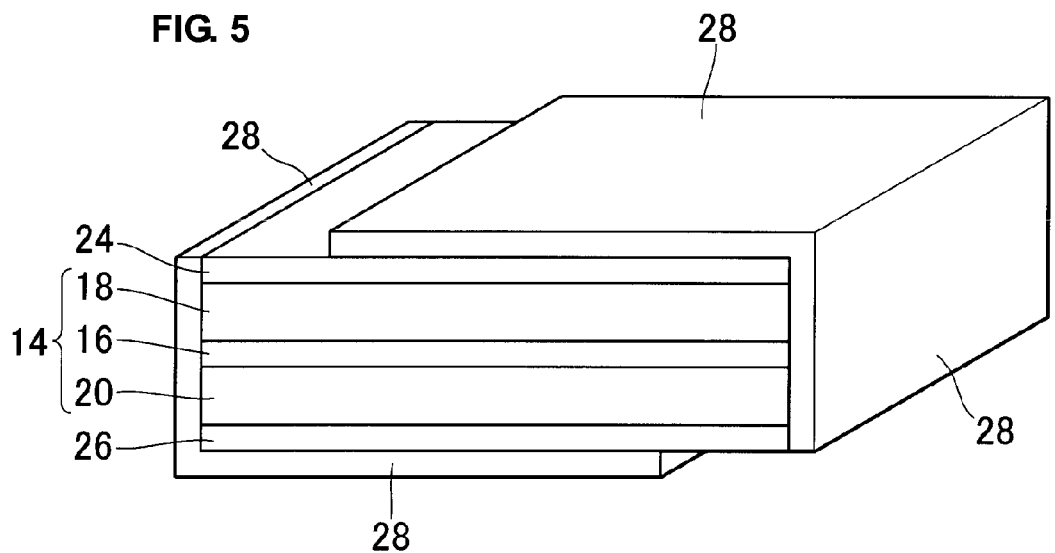
FIG. 5 is a perspective view showing a state in which protective films are provided on the end surfaces of the element body and the current collectors shown in FIG. 4.
Figure 6:
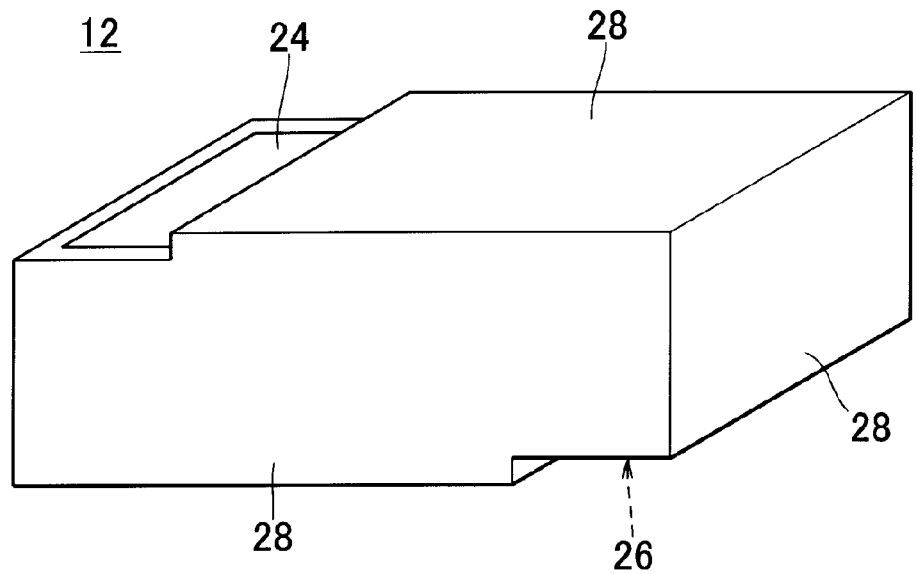
FIG. 6 is a perspective view showing a base body produced by providing protective films on the side surfaces of the element body and the current collectors shown in FIG. 5.

Furthermore, as shown in FIG. 5, protective films 28 are provided on the respective opposing end surfaces in the longitudinal direction substantially perpendicular to the lamination direction of the element body 14. Next, as shown in FIG. 6, protective films 28 are provided on the respective opposing side surfaces in the width direction of the element body 14. The protective films 28 on the upper and lower surfaces, the end surfaces, and the side surfaces of the element body 14 may be formed in any desired order or may be formed at the same time. Therefore, in the resultant element body 14, the current collectors 24 and 26 are exposed on the respective opposing surfaces near the respective opposing end surfaces in the longitudinal direction of the element body 14. The protective films 28 are provided to protect the resultant element body 14 and the current collectors 24 and 26, and also function as insulating layers. Furthermore, terminal electrodes 30 and 32 are provided on the opposing ends of the base body 12 using Ag, for example, so as to wrap the exposed portions of the current collectors 24 and 26, respectively. As a result, the chip battery 10 shown in FIG. 1 is provided.

The terminal electrodes 30 and 32 are formed by, for example, applying Ag paste on the end surfaces of the base body 12 and then baking the paste. In this case, the Ag paste is preferably baked at as low of a temperature as possible because the terminal electrodes 30 and 32 wrap the protective films 28. The terminal electrodes 30 and 32 may be formed by a thin film forming method, such as vapor deposition or sputtering, or a plating method, for example. The terminal electrodes 30 and 32 may be formed by applying a conductive adhesive and then curing the adhesive.

In the chip battery 10, the terminal electrodes 30 and 32 are brought into surface contact with the current collectors 24 and 26, respectively, in the exposed portions of the current collectors 24 and 26, thereby increasing the reliability of contact between the terminal electrodes 30 and 32 and the current collectors 24 and 26, respectively. In addition, the surface contact between the terminal electrodes 30 and 32 and the current collectors 24 and 26, respectively, decreases resistance between the terminal electrodes 30 and 32 and the current collectors 24 and 26, respectively, thereby achieving the chip battery 10 having a low internal resistance. Furthermore, the terminal electrodes 30 and 32 are arranged over the current collectors 24 and 26 and the protective films 28, and thus, the adhesion and sealing property of the entire chip battery 10 is increased.

Furthermore, the chip battery 10 has a structure in which the terminal electrodes 30 and 32 are provided on both ends of the element body 14 in the direction substantially perpendicular to the lamination direction thereof, thereby enabling mounting in a state in which the lamination direction of the element body 14 intersects a substrate. Therefore, when mounting the chip battery 10, a low profile is achieved. In particular, even when the amount of the electrode active material included in each of the positive electrode layer 18 and the negative electrode layer 20 is increased to increase the capacity or when the opposing areas between the positive electrode layer 18 and the negative electrode layer 20 and the current collectors 24 and 26, respectively, are increased to increase the current, the chip battery 10 can be surface-mounted in a low-profile state.

Figure 8A:
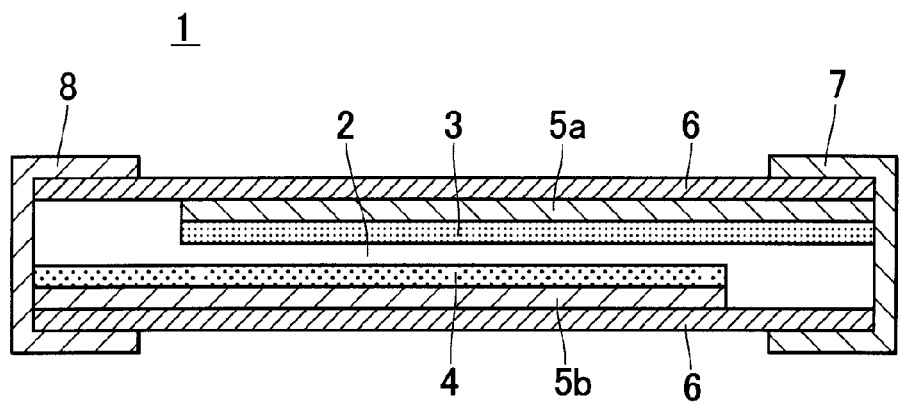
FIGS. 8A and 8B are an explanatory sectional view and a plan view, respectively, showing an example of conventional chip batteries.
Figure 8B:
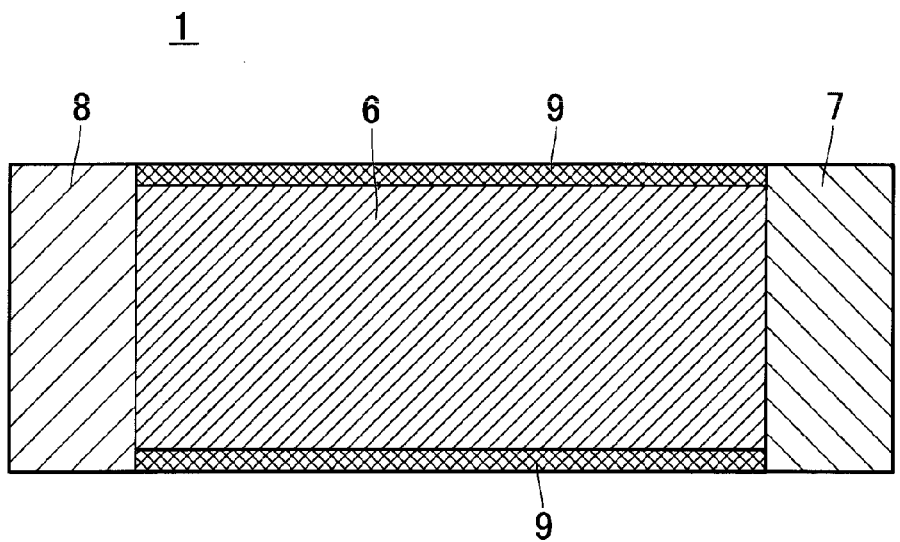

In the chip battery 10, the expression "the surface contact between the terminal electrodes 30 and 32 and the current collectors 24 and 26, respectively" indicates contact in a substantially rectangular area in which one side substantially corresponds to the short side of the substantially rectangular element body 14, and the other side corresponds to a length (longer than the thickness of the current collectors 24 and 26) of about 5% to about 40% of the long side of the element body 14. This contact area secures a large contact area as compared to line contact between a current collector and a terminal electrode as in the conventional chip battery shown in FIGS. 8A and 8B.

Since the chip battery 10 uses the solid electrolyte layer 16 as an electrolyte, the chip battery 10 has a small size and improved safety as compared to a battery using a liquid electrolyte. In addition, since the element body 14 of the chip battery 10 is formed by pressure-forming the positive electrode layer material, the solid electrolyte layer material, and the negative electrode layer material, diffusion between the respective layers does not significantly occur, unlike in a sintered compact (oxide). Therefore, good interfaces with excellent ionic conductivity are provided between the positive and the negative electrode layers 18 and 20 and the solid electrolyte layer 16. Even when the element body 14 is made of a sintered compact (oxide), the chip battery 10 having a reduced internal resistance and improved reliability of connection between the current collectors 24 and 26 and the terminal electrodes 30 and 32 is provided by surface contact between the current collectors 24 and 26 and the terminal electrodes 30 and 32, respectively.

Furthermore, in the chip battery 10, the current collectors 24 and 26 are formed by a vapor phase method, and thus, do not include a binder. Therefore, the internal resistance of the chip battery 10 is prevented from being increased by a binder with relatively high resistivity. Also, since the current collectors 24 and 26 are each made of a thin film electrode formed by the vapor phase method, there is no possibility of peeling of the current collectors 24 and 26, and the current collectors 24 and 26 are easy to handle during the formation of the chip battery 10. When the terminal electrodes 30 and 32 are provided on the current collectors 24 and 26, respectively, the current collectors 24 and 26 are brought into surface contact with the terminal electrodes 30 and 32, respectively, thereby decreasing the resistance between the current collectors 24 and 26 and the terminal electrodes 30 and 32, respectively.

In addition, the material of the protective films 28 is not limited to an epoxy resin, and an insulator, such as ceramic or glass, may be used for sealing. Also, a thermosetting resin other than an epoxy resin may be used, a mixture of a plurality of resins may be used, or a plurality of resins may be formed into layers.

The chip battery 10 can be used by being accommodated in a package 40. The package 40 includes an insulating substrate 42 and a cap-shaped housing member 44 which covers the insulating substrate 42. The insulating substrate 42 is made of, for example, ceramic, such as alumina, or an insulating material, such as a glass epoxy resin. Although, in the example shown in FIG. 7, the chip battery 10 and an electronic device 46, which the chip battery 10 backs up, are mounted together on the insulating substrate 42, only the chip battery 10 may be mounted. The housing member 44 is arranged to cover the chip battery 10 and the electronic device 46.

Figure 7:
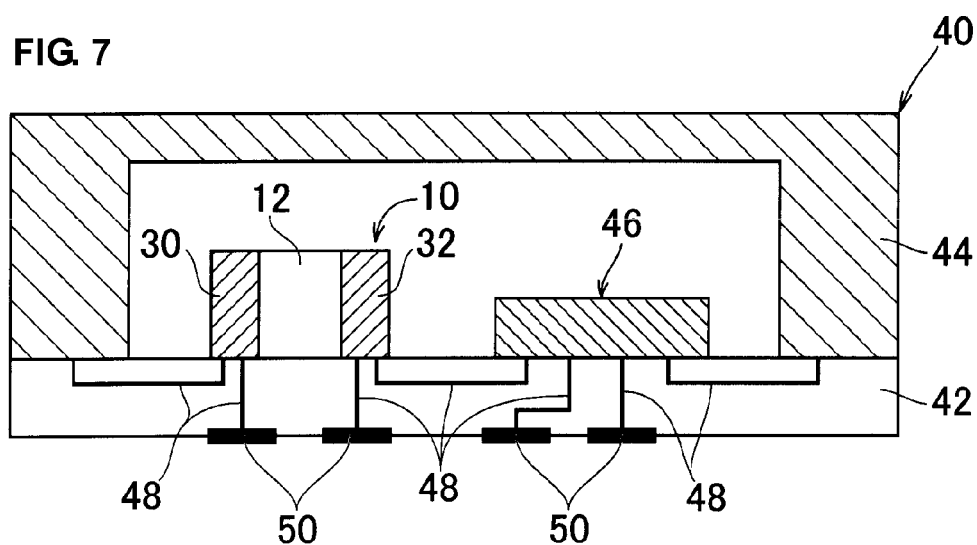
FIG. 7 is an explanatory view showing an example in which the chip battery shown in FIG. 1 is accommodated in a package.

The chip battery 10 and the electronic device 46 are connected to each other through a wiring members 48 provided in the insulating substrate 42. Although FIG. 7 schematically shows the wiring members 48, the wiring members 48 actually include, for example, planar pattern wirings provided on the insulating substrate 42 and through-hole wirings provided in the insulating substrate 42. Furthermore, external electrodes 50 are provided on the outer surface of the insulating substrate 42 and connected to internal circuits of the package 40 through wiring members 48. In the example shown in FIG. 7, the housing member 44 is used as a portion of a circuit and is thus composed of a metal material such as aluminum or stainless steel. However, when the housing member 44 is not used as a portion of a circuit, the housing member 44 may be made of an insulating material.

As described above, the chip battery 10 can also be used while being accommodated in the package 40. Also in this case, when the chip battery 10 is configured as described above, the chip battery has high connection reliability between the current collectors 24 and 26 and the terminal electrodes 30 and 32, respectively, and a low internal resistance, thereby achieving outstanding battery characteristics.

EXAMPLE 1

The chip battery shown in FIG. 1 was formed using a $Li_2S—P_2S_5$ solid electrolyte as a solid electrolyte. The solid electrolyte was prepared using a mixed material including $Li_2S$ and $P_2S_5$ at a molar ratio of about 7:3. A mixture including lithium cobaltate as a positive electrode active material and the solid electrolyte at a mass ratio about 1:1 was used as a positive electrode layer material. A mixture including a graphite powder as a negative electrode active material and the solid electrolyte at a mass ratio about 1:1 was used as a negative electrode layer material. A three-layer structure including the positive electrode layer material, the solid electrolyte, and the negative electrode layer material in that order was formed and then pressure-formed under a pressure of about 3 ton/cm² to form a pellet including a positive electrode layer and a negative electrode layer which were provided on both surfaces of a solid electrode layer.

Then, Pt was deposited by sputtering to form a current collector on each of the positive electrode layer and the negative electrode layer of the resulting pellet, and the pellet was cut into a size of about 2 mm×about 2 mm×about 1 mm, for example, to obtain an element body. At this time, the cut surface was polished to insulate between the positive electrode layer and the negative electrode layer. In the laminate of the element body 14, one side of the current collectors 24 and 26 in the lamination direction, as shown in FIG. 1, was about 1 mm, for example. Then, as shown in FIG. 6, an epoxy resin was coated so as to partially expose the opposing current collectors, and Ag electrodes were formed as terminal electrodes to cover the exposed surfaces of the current collectors. Consequently, the chip battery shown in FIG. 1 was formed.

For the resultant chip battery, charge-discharge measurements were performed at a current density of about 50 μA/cm². As a result, it was found that a chip battery having a small size of about 2 mm×about 2 mm×about 1 mm, which has not previously been achieved, and a discharge capacity of about 10 μAh at a discharge voltage of about 1 V to about 4 V, for example, is obtained.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A chip battery comprising:
an element body including a solid electrolyte layer, a positive electrode layer provided on a surface of the solid electrolyte layer, and a negative electrode layer provided on another surface of the solid electrolyte layer;
current collectors respectively provided on the positive electrode layer and the negative electrode layer of the element body;
protective films arranged to cover a portion of a surface of each of the current collectors that extends perpendicular or substantially perpendicular to a lamination direction of the element body such that the surface of each of the current collectors that extends perpendicular or substantially perpendicular to the lamination direction of the element body includes an exposed portion that is not covered by the protective films; and
terminal electrodes provided on end surfaces of the element body so as to contact a respective one of the current collectors along the exposed portion of the surface of the respective one of the current collectors that extends perpendicular or substantially perpendicular to the lamination direction of the element body.

2. The chip battery according to claim 1, wherein the element body has a substantially rectangular plate shape.

3. The chip battery according to claim 1, wherein the current collectors include Pt.

4. The chip battery according to claim 1, wherein the positive electrode layer includes $LiCoO_2$.

5. The chip battery according to claim 4, wherein the positive electrode layer further includes $Li_2S$—$P_2S_5$ mixed with the $LiCoO_2$.

6. The chip battery according to claim 1, wherein the solid electrolyte layer includes $Li_2S$—$P_2S_5$.

7. The chip battery according to claim 1, wherein the negative electrode layer includes graphite.

8. The chip battery according to claim 7, wherein the negative electrode layer further includes $Li_2S$—$P_2S_5$ mixed with the graphite.

9. The chip battery according to claim 1, wherein the protective films are made of epoxy resin.

10. The chip battery according to claim 1, wherein the terminal electrodes contact the respective one of the current collectors only along the surface of the element body that extends perpendicular or substantially perpendicular to the lamination direction of the element body.

11. The chip battery according to claim 1, wherein each of the protective films is disposed on a surface of the element body that extends perpendicular or substantially perpendicular to the lamination direction of the element body and on a surface of the element body that extends parallel or substantially parallel to the lamination direction of the element body.

12. A chip battery comprising:
an element body including a solid electrolyte layer, a positive electrode layer provided on a surface of the solid electrolyte layer, and a negative electrode layer provided on another surface of the solid electrolyte layer;
current collectors respectively provided on the positive electrode layer and the negative electrode layer of the element body and each of the current collectors includes an exposed portion along a surface of the element body that extends perpendicular or substantially perpendicular to a lamination direction of the element body;
protective films arranged to cover each of the current collectors along portions of the respective surface of the element body that extends perpendicular or substantially perpendicular to the lamination direction of the element body except for the exposed portion of each of the current collectors; and
terminal electrodes arranged on the element body so as to be electrically connected to the exposed portion of a respective one of the current collectors.

13. The chip battery according to claim 12, wherein the element body has a substantially rectangular plate shape.

14. The chip battery according to claim 12, wherein the current collectors include Pt.

15. The chip battery according to claim 12, wherein the positive electrode layer includes $LiCoO_2$.

16. The chip battery according to claim 15, wherein the positive electrode layer further includes $Li_2S$—$P_2S_5$ mixed with the $LiCoO_2$.

17. The chip battery according to claim 12, wherein the solid electrolyte layer includes $Li_2S$—$P_2S_5$.

18. The chip battery according to claim 12, wherein the negative electrode layer includes graphite.

19. The chip battery according to claim 18, wherein the negative electrode layer further includes $Li_2S$—$P_2S_5$ mixed with the graphite.

20. The chip battery according to claim 12, wherein the protective films are made of epoxy resin.

21. The chip battery according to claim 12, wherein the terminal electrodes contact the respective one of the current collectors only along the surface of the element body that extends perpendicular or substantially perpendicular to the lamination direction of the element body.

22. The chip battery according to claim 12, wherein each of the protective films is disposed on the surface of the element body that extends perpendicular or substantially perpendicular to the lamination direction of the element body and on a surface of the element body that extends parallel or substantially parallel to the lamination direction of the element body.

* * * * *